April 11, 1967  W. B. KRAUSKOPF  3,313,020
METHOD OF MANUFACTURING AN INSULATED CONTAINER
Filed Aug. 21, 1962  3 Sheets-Sheet 1
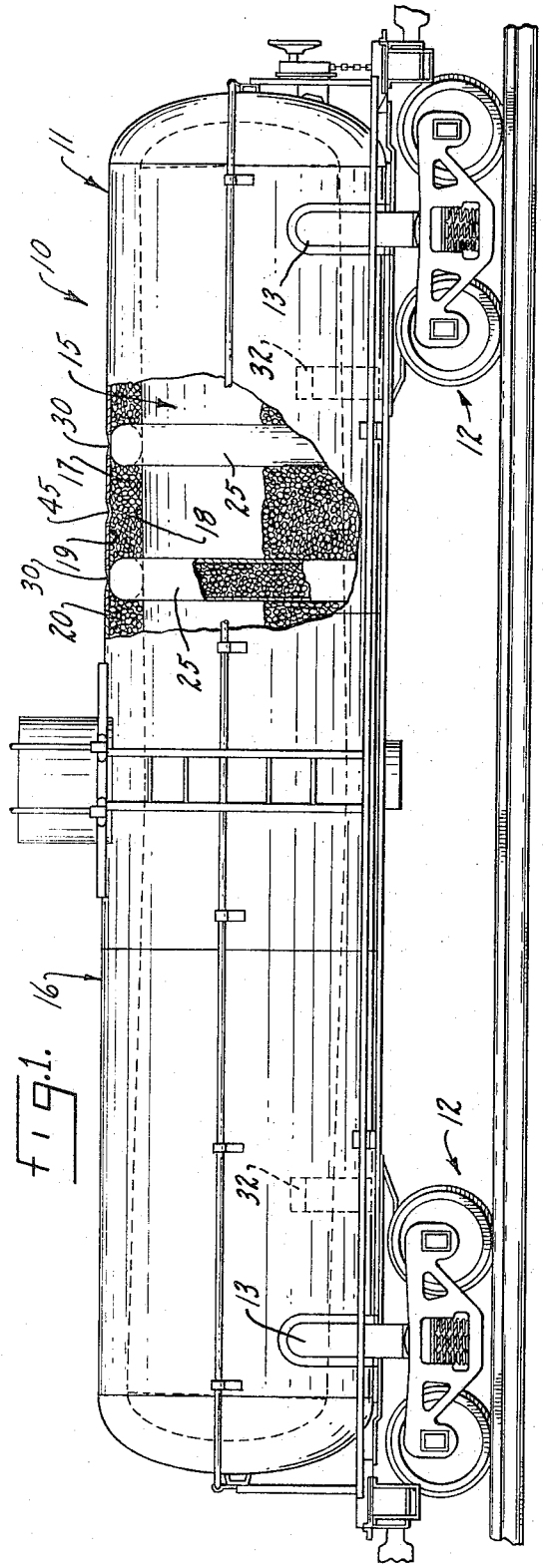
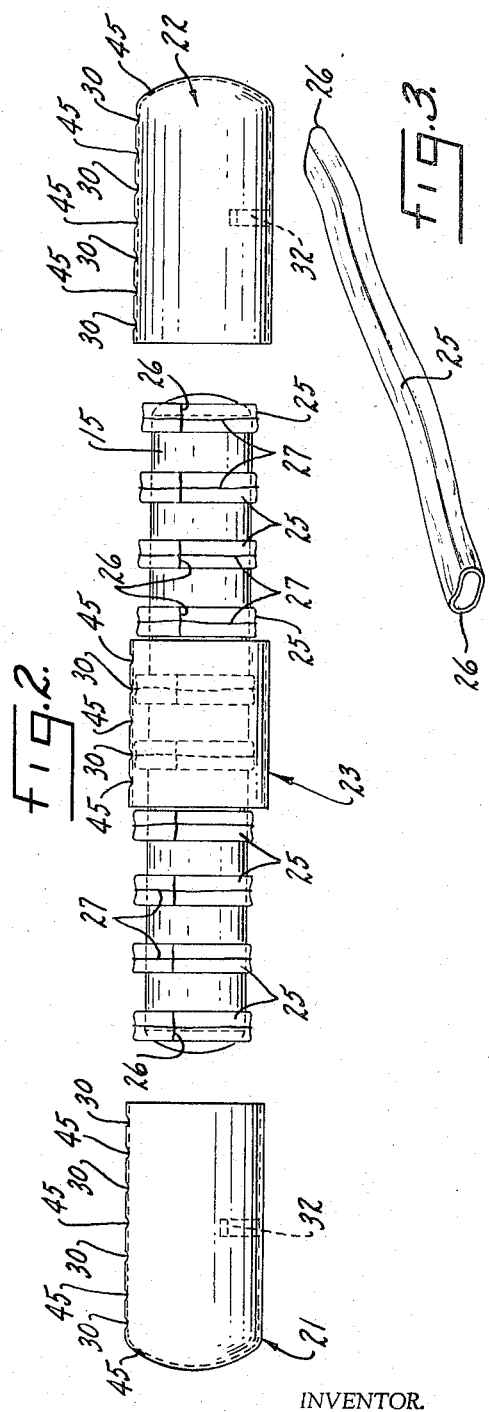
INVENTOR.
William B. Krauskopf,
BY
Byron, Hume, Groen & Clement
Attorneys.

April 11, 1967 W. B. KRAUSKOPF 3,313,020
METHOD OF MANUFACTURING AN INSULATED CONTAINER
Filed Aug. 21, 1962 3 Sheets-Sheet 2
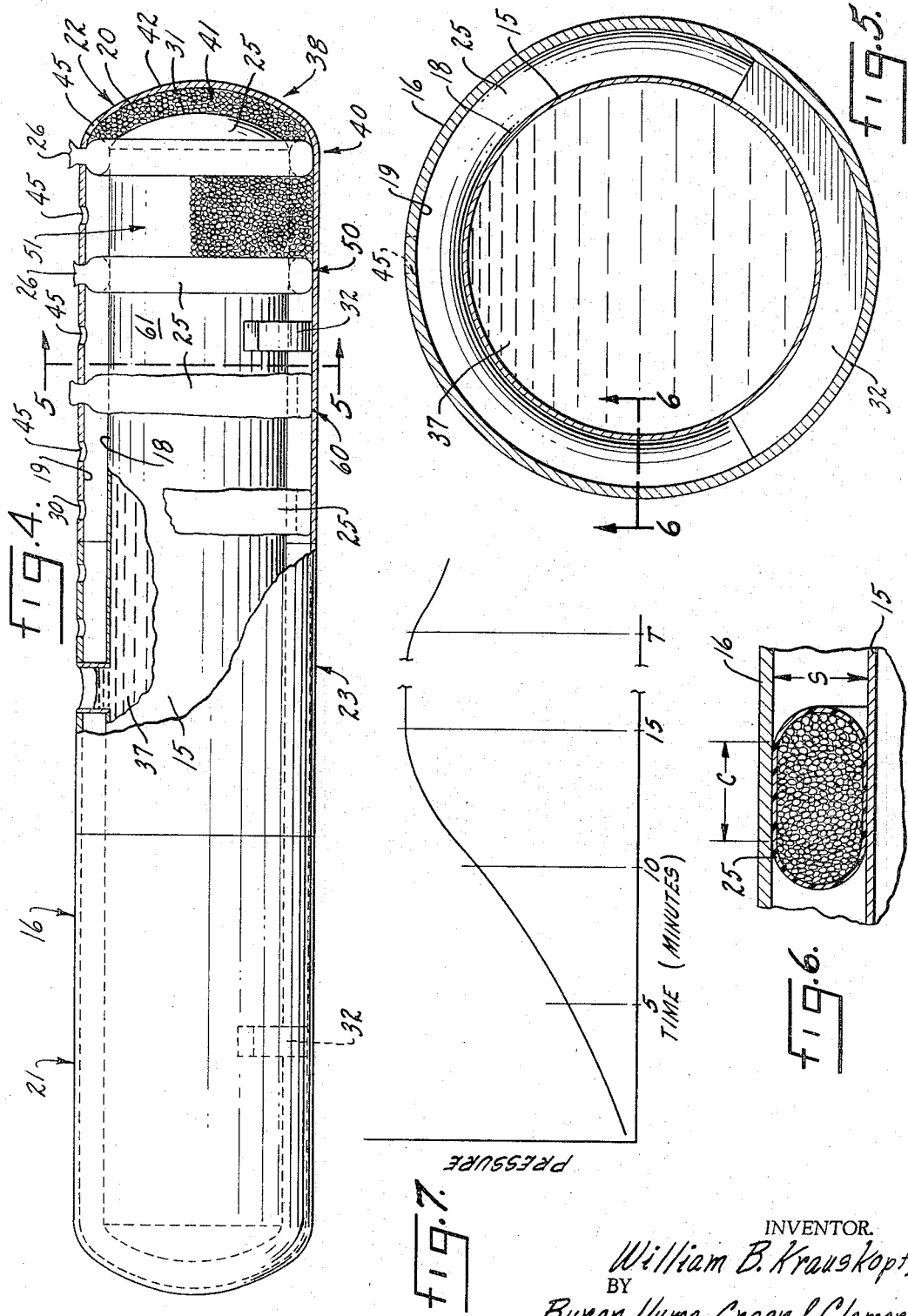
INVENTOR.
William B. Krauskopf,
BY
Byron, Hume, Groen & Clement
Attorneys.

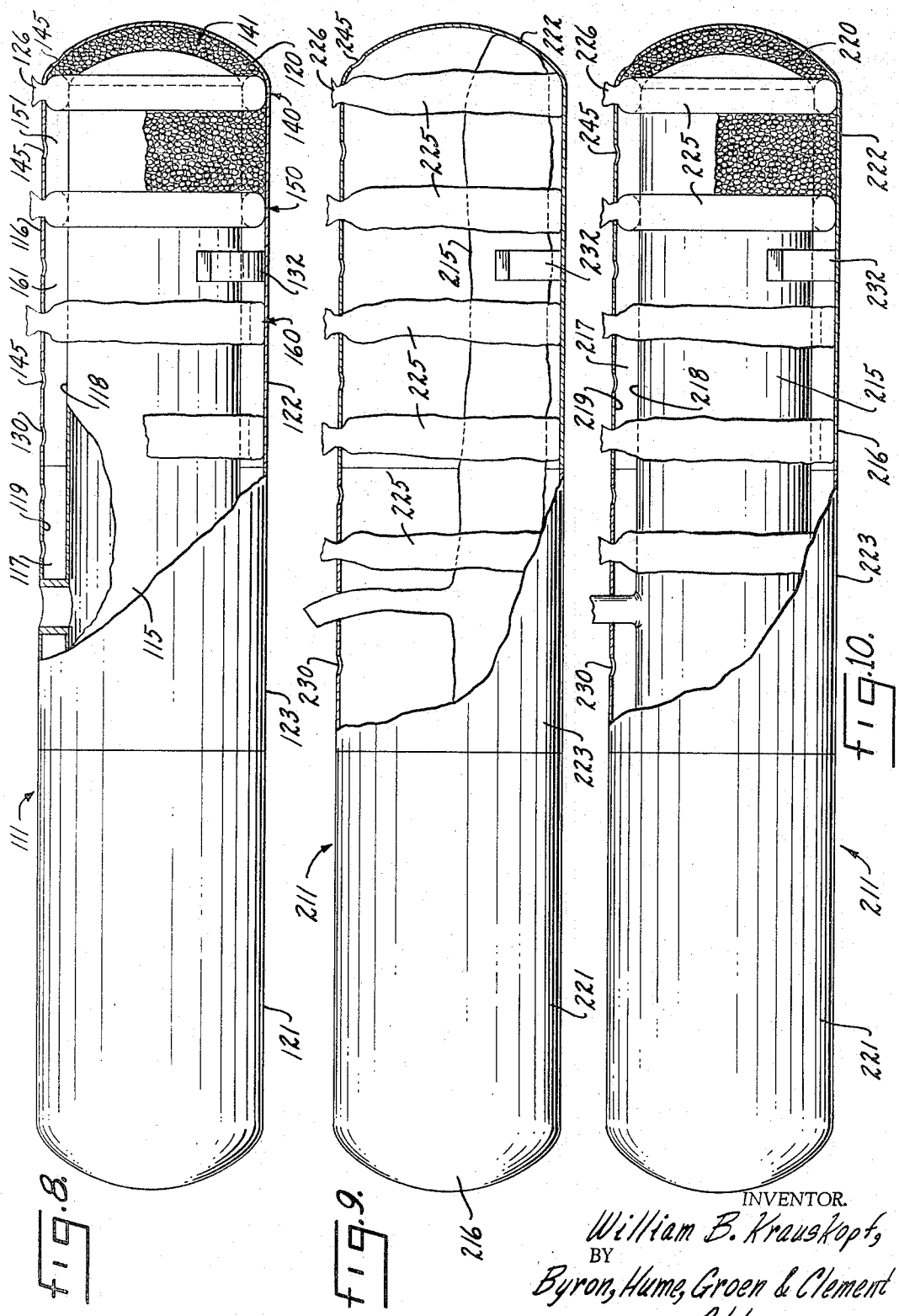

United States Patent Office 3,313,020
Patented Apr. 11, 1967

3,313,020
METHOD OF MANUFACTURING AN
INSULATED CONTAINER
William B. Krauskopf, Lombard, Ill., assignor to Union
Tank Car Company, Chicago, Ill., a corporation of
Illinois
Filed Aug. 21, 1962, Ser. No. 218,270
20 Claims. (Cl. 29—455)

This invention relates in general to an improved method of manufacturing an insulated container.

It is an object of the present invention to provide an improved method of manufacturing an insulated container for fluids and the like.

It is another object to provide an improved method of manufacturing an insulated, double-wall container for the storage and/or transport of fluids and the like.

It is still another object to provide a method of the aforedescribed character utilizing foamed cellular plastic as an insulating material.

It is yet another object to provide a method of the aforedescribed character which assures the formation of a foamed cellular plastic insulation having a substantially uniform density throughout.

It is a further object to provide a method of the aforedescribed character which lends itself readily to the manufacture of a double-walled insulated container comprising a relatively flimsy inner container and a structural outer shell.

It is still a further object to provide a method of the aforedescribed character which facilitates the manufacture of an insulated container having a relatively flimsy inner shell comprising a limited amount of costly, corrosion resistant material.

It is another object to provide a method of insulating a double-wall container with foamed cellular plastic wherein pressure exerted on the inner wall as a consequence of a foaming reaction is appropriately balanced to prevent the inner wall from rupturing or otherwise deforming.

It is still another object to provide a method of the aforedescribed character which assures the establishment of a uniformly dense, foamed cellular plastic insulation regardless of the configuration or positioning of an inner container within an outer shell.

The above and other objects are realized in accordance with the present invention by providing an improved method of manufacturing an insulated container. In general, the invention contemplates compartmentalizing the space between the inner and outer walls of a double-wall container to establish optimum size mold cavities which are sealed off from one another and introducing a foamed plastic producing material into the compartments. The material foams and hardens in the optimum size compartments into a cellular core of foamed plastic of uniform density and substantial strength.

The invention will best be understood by reference to the following description taken in connection with the accompanying drawings, in which:

FIGURE 1 is a side elevational view, partially in section, of a railway tank car incorporating an insulated container constructed in accordance wih the method embodying features of the present invention;

FIGURE 2 is a side elevational view of the container seen in FIGURE 1, in the initial stages of its construction;

FIGURE 3 is a perspective view of a semi-collapsed inflatable tube utilized in the present method;

FIGURE 4 is a side elevational view, partially in section, illustrating one form of insulated container at an intermediate stage in its construction;

FIGURE 5 is a sectional view taken along line 5—5 of FIGURE 4;

FIGURE 6 is a sectional view taken along line 6—6 of FIGURE 5;

FIGURE 7 is a graphic illustration of the relationship between elapsed time and expansion pressure exerted by the foaming plastic in accordance with the present invention;

FIGURE 8 is a side elevational view, partially in section, of another form of the insulated container at an intermediate stage in its construction;

FIGURE 9 is a side elevational view, partially in section, of yet another form of the insulated container at an intermediate stage in its construction; and FIGURE 10 is a side elevational view, partially in section, of the container illustrated in FIGURE 9 at a later intermediate stage in its construction.

Referring now to the drawings and particularly to FIGURE 1, a railway tank car embodying features of the present invention is illustrated generally at 10. The tank car 10 comprises an elongated insulated container 11 supported on its oppositely disposed ends by substantially identical wheel trucks 12 of generally conventional construction. Saddle-shaped bolsters 13 connected to the container 11, and to the trucks 12, firmly mount the container 11 on the trucks 12.

The insulated container 11 embodies features of one form of the present invention and, as such, is specifically adapted to utilization in the railway tank car 10, for example. The structural integrity and strength of the insulated container 11 is so high as to obviate the necessity of using understructure extending between the railway trucks 12 in support of the container 11. It should be understood, however, that advantageous application of the container 11 is not limited to railway tank cars, or even to tank trucks or the like, and it might also be utilized in stationary structures where relatively sturdy construction is a necessity.

Another form of insulated container constructed in accordance with the present invention is illustrated generally at 111 in FIGURE 8, at an intermediate stage in the insulated container 111 is somewhat simpler in construction. In contrast to the insulated container 11, its construction and is slightly less sturdy. The method embodying features of the present invention facilitates fabrication of the insulated container 111 and the insulated container 111 is, as would be expected, somewhat less costly than the insulated container 11.

Yet another form of insulated container constructed in accordance with the present invention is illustrated generally at 211 in FIGURES 9 and 10, at varying stages in its construction. The insulated container 211 is similar in construction to the insulated container 11, insofar as high structural integrity and strength is concerned. In this light, it might be utilized in storage tank installations where substantial strength is required in a railway tank car, for example. The insulated container 111 is distinguished from the insulated container 11 in the characteristics of certain of its components..

Referring again to FIGURE 1 and specifically to the one form of insulated container 11, it will be seen to comprise an inner container 15 and an outer shell 16 defining an annular space 17 between the outermost surface 18 of the inner container 15 and the innermost surface 19 of the outer shell 16. This annular space 17 is filled with a uniform density core 20 of foamed cellular plastic having good insulation characteristics. The foamed cellular plastic is preferably a reaction product of organic polyisocyanate and a polyester or polyether. One example of such reactants is methyl glucoside polyether resin and polyisocyanate. It should be understood, however, that numerous other reactants might be utilized to obtain similar products.

According to the improved method embodying the present invention, the core 20 is molded in place in the annular space 17, which space 17 has been divided in fluid-tight relationship into optimum size mold cavities. The size of the cavities determined by, first, the rate at which appropriate reactants can satisfactorily be introduced and, second, the "cream time" (time lapse before foaming begins) of the reactants. The space 17 is preferably divided so that the volume of each mold cavity is precisely that which can be charged, at maximum charging rate, with a required charge of the reactants, in a period of time equal to or less than the "cream time." As a result the primary advantages of molding in place are realized. The core 20 of foamed cellular plastic is formed in optimum sized portions, the foaming reactants being appropriately restrained during the formation of each portion of the core 20 to assure uniform core density and obviate the formation of gas pockets, for example.

Turning now to FIGURE 2 an initial stage in the manufacture of the insulated container 11 is illustrated. The inner container 15 is first fabricated from relatively thin corrosion resistant material such as stainless steel, glass lined steel, or plastic or the like. The inner container 15 is of a relatively flimsy construction and, as such, is somewhat inexpensive to fabricate. Somewhat inexpensive, that is, when it is realized that the corrosion resistant material necessarily utilized in its fabrication is ordinarily quite expensive. It is the method embodying features of the present invention which readily facilitates use of such a flimsy inner container 15.

The outer shell 16 of the insulated container 11 is, on the other hand, fabricated from relatively heavy gauge steel or aluminum or the like in two generally cylindrical single closed end sections 21 and 22, and a generally cylindrical open end center section 23. Once fabricated, these sections 21, 22, and 23, are heat treated to relieve stresses developed during fabrication. The three sections 21, 22, and 23, are then ready to be slipped over the inner container 15 and welded together to form the outer shell 16. In this light, it should be understood that the use of three such sections is exemplary, and any plurality of sections might be utilized.

Precedent to assembling the outer shell 16 in enclosing relationship with the inner container 15, however, the inner container 15 is encircled in spaced relationship with a plurality of inflatable tubes 25 of polyethylene plastic or the like. Once the outer shell is assembled, the tubes 25 are adapted to be inflated to compartmentalize the annular space 17 between the inner container 15 and the outer shell 16. Each of the tubes 25 is normally cylindrical in cross-sectional configuration when inflated and is open at both ends 26, as seen in FIGURE 3, to facilitate introduction of an inflating medium.

To permit assembly of the outer shell 16 over the inner container 15 with the inflatable tubes 25 in place, the tubes 25 are initially tied in encircling relationship on the inner container 15 with wires 27 or the like. The open ends 26 of the tubes 25 are overlapped along the top of the inner container 15 so that they will be appropriately accessible to corresponding apertures 30 formed in spaced relationship along the top of the outer shell 16.

With the inflatable tubes 25 appropriately tied in encircling relationship on the inner container 15, the center section 23 of the outer shell 16 is slipped over the inner container 15 and positioned in the manner shown in FIGURE 2. Subsequently, the end sections 21 and 22 of the outer shell 16 are slipped over the oppositely disposed ends 31 of the inner container 15.

At this point, before the sections 21, 22, and 23 are brought together to be welded, spacer support blocks 32 of foamed cellular plastic or the like are seated within the oppositely disposed end sections 21 and 22, and positioned to support the inner container 15 within the outer shell 16. The blocks 32 are appropriately sized and shaped (see FIGURE 5) to seat the inner container 15 in prescribed spaced relationship within the outer shell 16 and define the annular space 17 having a predetermined cross-sectional configuration.

As illustrated in FIGURE 1, it is sometimes preferable to seat the inner container 15 in eccentric relationship with the outer shell 16 so that the inner container 15 can be constructed with a slight sag adjacent its mid-section (see FIGURE 1) to facilitate draining the inner container of its stored product. This relationship is not shown in succeeding views, being merely exemplary. Regardless of the cross-sectional configuration of the annular space 17, however, inflation of the tubes 25 causes them to adapt to this configuration and compartmentalize the space 17 in substantially fluid-tight relationship.

Welding the cylindrical sections 21, 22, and 23, together forms the outer shell 16, of course. Since it is fabricated from relatively heavy gauge steel or aluminum or the like, as has been pointed out, the outer shell 16 has a substantially high load bearing capacity. In this light, when the annular space 17 is uniformly filled with the core 20 of foamed cellular plastic the strength of the resulting insulated container 11 is substantially increased. The combination of the outer shell 16 and the core 20 of foamed cellular plastic, bonded to each other, is effective to obviate the necessity of utilizing outer superstructure with the tank car 10, for example.

At this point it should be pointed out that according to the present invention an alernative procedure for positioning the inflatable tubes 25 appropriately within the annular space 17 is to fish them around the inner container 15 with the wires 27, through the appropriately positioned apertures 30, after the outer shell 16 has been assembled and welded. This procedure is preferable where techniques utilized in welding the sections 21, 22, and 23, of the outer shell 16 are prone to damage prepositioned tubes 25.

Once the outer shell 16 is assembled, with the tubes 25 in place, the unfinished container 11 is heated to a preselected optimum temperature to establish a controlled environment for the plastic foaming reaction which subsequently takes place in the annular space 17 between the inner container 15 and the outer shell 16. The preselected temperature is preferably in excess of any ambient temperature which might be encountered where the container 11 is assembled according to the present invention, and might be of the order of 120° Fahrenheit, for example. The container 11, unfinished at this point, is preferably heated by the introduction of steam to the inner container 15, although any adaptable method of heating might be utilized.

A controlled environment is important because a prescribed amount of the aforementioned appropriate liquid reactants foam to a greater or lesser extent depending upon the temperature of the environment in which the foaming reaction takes place. Accordingly, if a known volume container (annular space 17) is to be properly filled with a prescribed charge of liquid plastic reactants, the environmental temperature must be relatively closely controlled. Furthermore, an environmental temperature somewhat higher than ambient temperature operates to assume greater uniformity in the density of the foamed cellular plastic throughout the core 20.

Referring now to FIGURE 4, after the unfinished container 11 has been heated, to a predetermined optimum temperature, the inner container 15 is preferably filled with a relatively incompressible liquid 37, water for example, to balance the pressure subsequently exerted by the foaming plastic in the space 17 between the inner container 15 and the outer shell 16. An alternative expedient is to pressurize the inner container 15 with an appropriate gas. The use of an incompressible liquid is more desirable and substantially simpler, of course, but in some instances, as where an inflatable inner container is utilized, liquid is not compatible with the inflatable material because of its weight, and the container normally must be pressurized with a gas.

In the present instance, when the container 11 has been filled with water 37, for example, the tie wires encircling the inflatable tubes 25 are removed and the ends 26 of each tube are drawn out of a corresponding aperture 30 in the outer shell 16 of the container 11. In this relationship, the ends of the tube 25 are in position to be inflated. At this point thse inflatable tube 25 nearest one end 38 of the container 11, as at 40, is preferably charged with a prescribed amount of the aforementioned liquid reactants. The ensuing foaming reaction inflates this tube 25.

Inflation of the tube 25, indicated at 40, seals off a compartment 41 defined by this tube 25, one end 31 of the inner container 15, and a corresponding end 42 of the outer shell 16. Since the inflatable tube 25 readily adapts itselft to variations in the spacing between the inner container 15 and the outer shell 16, it moves into intimate contact with the outer surface 18 of the inner container 15 and the inner surface 19 of the outer shell 16 along its entire length, as best seen in FIGURES 5 and 6. To assure that a substantial portion of the inflatable tube 25 engages the surfaces 18 and 19 and solidly seats the plastic filled tube 25 in the annular space 17, the normal diameter of the tube 25 is empirically calculated to assure that the width C of those portions of the tube 25 engaging each of the surfaces 18 and 19 is substantially equal to or in excess of the maximum spacing S between the inner container 15 and the outer shell 16.

The foaming reaction of the aforementioned liquid reactants is such that the pressure exerted on the inner container 15 and on the outer shell 16 increases as the reaction continues, up to a predetermined point, after which it decreases slightly. As illustrated in the graph shown in FIGURE 7, the maximum pressure developed within the tube is reached after a minimum of approximately 15 min. of reaction time, in the present instance. This time varies, of course, with variation in formulation of the reactants utilized.

Although it is presently considered preferable to inflate the tubes 25 by foaming appropriate plastic forming reactants within the tubes, it should be pointed out that they might be inflated with gas under pressure, for example, of other fluids. In the former case, of course, the foamed plastic which is established is retained as part of the finished core 20, while in the latter case the tubes 25 are deflated after corresponding compartments (41 for example) are filled with foamed plastic.

At any rate, after the predetermined time lapse, a prescribed charge of foamable liquid plastic reactants is introduced, preferably to the compartment 41. Thus, maximum advantage is taken of the pressure exerted by the foam within the tube 25 to assure that the tube 25, indicated generally at 40, does not slip "downstream" in the annular space 17 under the increasing pressure of the foaming reaction within the compartment 41.

The liquid reactants are introduced to the compartment 41 through an aperture 45 in the outer shell 16 of the inner container 11. The aperture 45 is positioned adjacent the top of the outer shell 16 so that the liquid reactants descend into the compartment 41 under the influence of gravity. When a prescribed charge of the liquid reactants has been introduced into the compartment 41, the aperture 45 is sealed in any conventional manner, as by a sealing plate (not shown), for example.

In the alternative, it is sometimes preferable to avoid cutting the additional apertures 45 (additional to apertures 30) in the shell 16. In such case the reactants are introduced to the compartments through apertures 30 also. This might be accomplished by forcing a reactant feed pipe past a corresponding inflated tube 25, for example. For purposes of explanation, however, the separate apertures 45 are utilized.

The foaming reaction of the liquid reactants then takes place within the compartment 41, completely filling the compartment with foamed cellular plastic. The foamed cellular plastic rigidifies to form a portion of the core 20. Since the volume of the compartment 41 is relatively small, the foaming reaction which takes place within the compartment 41 is substantially uniform throughout the extent of the compartment 41 and consequently a core 20 of substantially uniform density is established from the top to the bottom of the container 11. Furthermore, the environmental temperature, 120° F. in this case, is sufficiently high to assure that substantially uniform density throughout the thickness of the core 20, from the outer surface 18 of the inner container 15 to the inner surface 19 of the outer shell 16, is maintained.

Regardless of the relatively high pressures built up within the compartment 41 by the foaming reaction of the liquid reactants, the inflated tube 25, indicated at 40, remains firmly seated in position within the space 17. As has been pointed out, firm seating of this plastic filled tube 25 is assured because of the substantial pressure developed within the tube 25, and because the diameter of each tube 25 is such that a substantial surface area of the tube engages both the outer surface 18 of the inner container 15 and the inner surface 19 of the outer shell 16. Consequently, that portion of the foamed cellular plastic core 20 formed within the compartment 41 is substantially uniform in density throughout.

The foaming reaction within the compartment 41 establishes an adhesive-type bond between the foamed cellular plastic core 20 and the outer surface 18 of the inner container 15, as well as with the inner surface 19 of the outer shell 16. This bond is effective to assure that the core 20 of foamed cellular plastic, the inner container 15, and the outer shell 16, form a substantially unitary structure of high strength and integrity.

When that portion of the foamed plastic core 20 within the compartment 41 has been established, a prescribed charge of liquid reactants is preferably introduced into the free ends of the next inflatable tube 25, indicated generally at 50. This tube 25 inflates under the influence of the foaming plastic in a manner substantially identical to that described in relation to the tube 25 indicated generally at 40. Inflation of this second tube 25, indicated generally at 50, to the extent illustrated in FIGURES 5 and 6, seals off the next adjacent compartment 51 in substantially fluid-tight relationship from the remainder of the space 17 between the inner container 15 and the outer shell 16. After the prescribed period of time has elapsed, during which period maximum foaming pressure is developed in the tube 50 (see FIGURE 7), a prescribed charge of liquid reactants is introduced through a corresponding aperture 45 into the compartment 51. Subsequently, the aforedescribed foaming reaction takes place, completely filling the compartment 51 with foamed cellular plastic of substantially uniform density throughout.

When the foaming reaction within the compartment 51 has taken place, the foregoing sequence of operations is repeated with regard to the inflatable tube 25 indicated generally at 60, and the corresponding compartment 61 which it defines in cooperation with the inner container 15, the outer shell 16 and the inflated tube 25 (seen at 50) hereinbefore referred to. The foaming reaction within the compartment 61 completely envelopes the corresponding spacer support block 32, preferably composed of a block of foamed cellular plastic identical to that formed in the aforedescribed foaming reaction, to establish a substantially uniform portion of the foamed plastic core 20 within the compartment 61.

The foregoing sequence of operations in which a tube 25 is first filled with a prescribed charge of liquid plastic reactants and the compartments (41, 51, 61, etc.) defined are subsequently filled with a prescribed charge of liquid plastic reactants, is repeated along the length of the container 11. Since the volume of each compartment is precisely that which will be filled by the maximum charge which can be introduced in the "cream time" of the reactant formula, the compartments fill instantly and uniformly. There is no leakage into as yet empty compartments since the inflated tubes 25 establish virtually fluid-tight seals with the inner container 15 and the outer shell 16. Consequently, the entire core 20 of foamed cellular plastic is substantially uniform in density and fills the entire annular space 17, leaving no voids.

In contrast to the aforedescribed sequence for filling compartments 41, 51, etc., with foamed plastic, they might also be filled at random, of course, as long as opposite ends of the compartment are sealed off with corresponding inflated tubes 25. The sequence described is, however, generally the most easily followed.

The double-wall container 11 is virtually a unitary structural member when the complete core 20 is formed. As such, it is extremely strong and readily adapted to utilization in a railway tank car of the type illustrated in FIGURE 1. Due to the strong bond established between the core 20, the inner container 15, and the outer shell 16, movements of a stored liquid within the container 11, as when the tank car 10 is braked, for example, do not cause relative movement of these components with corresponding untoward effects. Nevertheless, the inner container 15 is of relatively flimsy construction, requiring a minimum amount of the expensive corrosion resistant materials normally required in such an application. In addition, the inner container 15 is supported only by the plastic core 20. Consequently, undesirable heat transfer through the metal supports normally required is avoided.

Turning now to FIGURE 8, the double-wall container 111 embodying features of another form of the present invention is illustrated at an intermediate stage in its construction. The insulated container 111 is distinguished from the aforedescribed insulated container 11 only in that both its inner and outer walls are fabricated from relatively flimsy material. Since the makeup and the method of construction of the two containers 11 and 111 is otherwise identical, a detailed description thereof is not thought to be necessary. Corresponding features of the insulated container 111 are identified by corresponding reference numerals plus 100 digits.

The container 111 is even less expensive to construct than the container 11, as will readily be recognized, though it is sturdy in construction due to its sandwich type construction. Furthermore, like the container 11, its inner container 115 is supported within its outer shell 116 solely by a core 120 of foamed cellular plastic and not by metal supports, for example, which transmit heat readily and reduce the insulating efficiency of the container.

Referring now to FIGURES 9 and 10, an insulated container 211 defining features of yet another form of the present invention is illustrated at intermediate stages in its construction. The insulated container 211 is distinguished from the insulated container 11 hereinbefore discussed only in that its inner wall is comprised of a flexibel material which readily bonds to foamed plastic. Various plastics and rubbers might be utilized.

More precisely, the container 211 includes an inner container 215 comprising an inflatable bag of rubber, for example. The structural outer shell 216 is assembled in enclosing realtionship with the bag 215 while the bag 215 is deflated, as seen in FIGURE 9. The bag 215 is subsequently inflated with an appropriate gas to a semirigid state, as seen in FIGURE 10. At this stage, the bag 215 is virtually identical in construction to the flimsy fabricated inner container 15 associated with the insulated container 11, resting on spacer support blocks 232, and encircled by inflatable tubes 225.

In all other aspects the container 211 and its method of construction are substantially identical to that described in relation to the insulated container 11. Consequently, corresponding features of the insulated container 211 are identified by identical reference numerals plus 200 digits.

A further detailed description of the insulated container 211 and its method of construction is not thought to be necessary.

The insulated container 211 combines all the attributes of the insulated container 11 plus additional features. For example, the inner bag 215 is prefabricated and requires no sophisticated assembly techniques, of course. It is readily transported, for example, to the point of container assembly, yet when the container 211 is completed it provides a structure virtually as sturdy as the aforedescribed insulated container 11 and of comparable structural integrity.

It is the method embodying features of the present invention which facilitates the manufacture of superior insulated container 11, 111, 211, of course. By dividing the space between the walls of a double-wall container into optimum size compartments, in fluid-tight relationship, a complete cellular plastic core of constantly uniform density, devoid of gas pockets and other defects, is assured. Furthermore, compartmentalizing is accomplished simply and expeditiously, regardless of the relative configuration and position of the inner and the outer container walls.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A method of manufacturing an insulated container, comprising the steps of: positioning an inner container relative to an outer shell so that a space is defined between said inner container and said outer shell, positioning an inflatable tube in surrounding relationship with said inner container and within said outer shell, then inflating said tube to seal off a compartment in said space in substantially fluid tight relationship from the remainder of said space, charging said compartment with insulating foam forming reactants whereby said reactants foam to form a core portion of insulating materials in said compartment between said inner container and said outer shell, and introducing foam forming reactants to said space outside of said compartment to form insulating material therein.

2. The method of claim 1 further characterized by and including the step of: inflating said tube by charging with insulating foam forming reactants whereby said reactants foam to inflate it, and permitting a predetermined period of time to elapse between the time said inflatable tube is charged with reactants and the time reactants are introduced into said compartment.

3. The method of claim 2 further characterized by and including the step of: permitting a sufficient period of time to elapse for said foam forming reactants within said inflatable tube to foam to an extent sufficient to exert maximum sealing pressure against said inner container and said outer shell.

4. The method of claim 1 further characterized by and including the step of: inflating said tube to a sufficiently large outside diameter to assure that the width of the portion of said tube engaging each of said inner container and said outer shell is substantially equal to or in excess of the maximum spacing between said inner container and said outer shell where said tube surrounds said inner container.

5. A method of manufacturing an insulated container, comprising the steps of: positioning an inner container relative to an outer shell so that a space is defined between said inner container and said outer shell, then forming a barrier in surrounding relationship with said inner container and within said outer shell to seal off a compartment in said space in substantially fluid tight relationship from the remainder of said space, charging said compartment with insulating foam forming reactants whereby said reactants foam to form a core portion of insulating material in said compartment between said inner container and said outer shell, and introducing foam forming reactants to the remainder of said space to form insulating material therein.

6. A method of manufacturing an insulated container, comprising the steps of: positioning an inner container relative to an outer shell so that a space is defined between said inner container and said outer shell, then forming successively a plurality of endless barriers between said inner container and said outer shell to seal off a plurality of compartments in said space in substantially fluid tight relationship from each other, successively charging each of said compartments with insulating foam forming reactants whereby said reactants foam to form a core of insulating material between said inner container and said outer shell.

7. A method of manufacturing an insulated container, comprising the steps of: positioning an inner container relative to an outer shell so that a space is defined between said inner container and said outer shell, then positioning a series of inflatable tubes between said inner container and said outer shell and inflating said tubes to seal off said space into a series of compartments, and charging said compartments with insulating foam forming reactants whereby said reactants foam to form a core of insulating material between said inner container and said outer shell.

8. The method of claim 7 further characterized in that each of said tubes is inflated by charging with insulating foam forming reactants which foam to inflate them and compartmentalize said space.

9. A method of manufacturing a railway tank car, comprising the steps of: forming a tank by providing a generally cylindrical inner container, positioning a plurality of generally cylindrical outer shell sections in enclosing relationship with said inner container, joining said cylindrical outer shell sections together to form a complete outer shell and define a space between said inner container and said outer shell, then forming a plurality of barriers in surrounding relationship with said inner container and within said outer shell to seal off a plurality of compartments in said space, charging said compartments with insulating foam forming reactants whereby said reactants foam to form a core of insulating material between said inner container and said outer shell; and supporting said outer shell sections of said tank on truck assemblies.

10. The method of claim 9 further characterized by and including the step of: treating the generally cylindrical outer shell sections to relieve stresses in said sections precedent to positioning said sections in enclosing relationship with said inner container.

11. The method of claim 9 further characterized by and including the step of: substantially filling said inner container with a relatively incompressible fluid so that the said fluid serves to balance the pressure exerted on said inner container by the foaming of said reactants.

12. A method of manufacturing an insulated container, comprising the steps of: positioning an inner container relative to an outer shell so that a space is defined between said inner container and said outer shell, then positioning a series of inflatable tubes around said inner container and spaced from each other within said outer shell, successively inflating said tubes by charging them with insulating foam forming reactants to seal off said space into a plurality of compartments, and successively charging said compartments with insulating foam forming reactants whereby said reactants foam to form a core of insulating material between said inner container and said outer shell.

13. A method of manufacturing an insulated container, comprising the steps of: positioning an inner container relative to an outer shell so that a space is defined between said inner container and said outer shell, then successively positioning means between said inner container and said outer shell to seal off said space into a plurality of compartments, and successively charging said compartments with insulating foam forming reactants whereby said reactants foam to form a core of insulating material between said inner container and said outer shell.

14. A method of manufacturing an insulated container, comprising the steps of: positioning an inner container relative to an outer shell so that a space is defined between said inner container and said outer shell, then positioning a series of barrier forming means between said inner container and said outer shell, energizing said barrier forming means to seal off said space into a series of compartments, and charging said compartments with insulating foam forming reactants whereby said reactants foam to form a core of insulating material between said inner container and said outer shell.

15. A method of manufacturing an insulated container, comprising the steps of: positioning an inner container relative to an outer shell so that a space is defined between said inner container and said outer shell, then positioning a series of inflatable tubes between said inner container and said outer shell, inflating said tubes one at a time to seal off said space into a plurality of compartments, and charging each compartment with insulating foam forming reactants after the compartment is formed whereby said reactants foam to form core portions of insulating material in each compartment between said inner container and said outer shell.

16. A method of manufacturing an insulated container, comprising the steps of: positioning an inner container relative to an outer shell so that a space is defined between said inner container and said outer shell, then forming an endless barrier between said inner container and said outer shell to seal off a compartment in said space in substantially fluid tight relationship from the remainder of said space, charging said compartment with insulating foam forming reactants whereby said reactants foam to form a core portion of insulating material in said compartment between said inner container and said outer shell, and introducing foam forming reactants to the remainder of said space to form insulating material therein.

17. A method of manufacturing a large insulated storage tank for railway tank cars or the like, comprising the steps of: providing a substantially annular space between a generally cylindrical inner container and a generally cylindrical outer shell, selecting reactant introducing means capable of introducing insulating foam forming reactants to the space at a prescribed maximum rate, selecting rectants having a predetermined optimum cream time for foaming into a cellular plastic insulating material, then dividing the space into sealed compartments of a size which can be suitably charged with an amount of reactants capable of forming a cellular plastic insulating core portion of optimum density in said compartment within said predetermined time at said pescribed charging rate, charging said compartment with said foam forming reactants from said reactant introducing means at said prescribed maximum rate for said predetermined time whereby said reactants foam to form said core portion, and introducing foam forming reactants to said space outside of said compartment to form insulating material therein.

18. A method of manufacturing a structural member, comprising the steps of: positioning a pair of continuous face members relative to each other so that a space is defined therebetween, positioning inflatable means between said face members and then inflating said inflatable means so as to seal off said space into a plurality of compartments, and charging said compartments with foam forming reactants, whereby said reactants foam to form a core of material between said face members.

19. The method of claim 18 further characterized by inflating said inflatable means by introducing and causing foam forming reactants to foam therewithin, whereby said inflatable means press tightly against said face members and compartmentalize said space.

20. The method of claim 19 further characterized by inflating said inflatable means between said face members in a prescribed sequence to successively form adjacent compartments between said face members, and successively charging each compartment with foam forming reactants as it is formed.

References Cited by the Examiner

UNITED STATES PATENTS

| | | | |
|---|---|---|---|
| 1,908,684 | 5/1933 | Buchanan | 280—5.12 |
| 2,000,819 | 5/1935 | Burkhardt | 105—360 |
| 2,281,407 | 3/1942 | Bohnsack | 29—460 |
| 2,376,653 | 5/1945 | Boyer | 18—59 |
| 2,512,552 | 6/1950 | Quarfoot. | |
| 2,616,163 | 11/1952 | Schmitz et al. | 29—460 |
| 2,653,139 | 9/1953 | Sterling | 296—31 X |
| 2,690,987 | 10/1954 | Jeffries et al. | 280—5.12 X |
| 2,744,042 | 5/1956 | Pace | 296—31 X |
| 2,826,421 | 3/1958 | Mueller | 280—5.12 |
| 2,879,785 | 3/1959 | Vesterdal et al. | 105—360 X |
| 2,907,284 | 10/1959 | Folmobee | 105—360 |
| 2,961,116 | 11/1960 | Jeppson | 220—9 |
| 2,962,183 | 11/1960 | Rill et al. | 220—9 |
| 3,007,208 | 11/1961 | Urban | 18—59 |
| 3,013,922 | 12/1961 | Fisher et al. | 220—9 |
| 3,125,346 | 3/1964 | Poltorak | 264—45 X |
| 3,158,383 | 11/1964 | Anderson et al. | |
| 3,242,240 | 3/1966 | Tantlinger | 264—45 |

CHARLIE T. MOON, *Primary Examiner.*

LEO QUACKENBUSH, *Examiner.*

MILTON BUCHLER, D. E. HOFFMAN,
*Assistant Examiners.*

UNITED STATES PATENT OFFICE
CERTIFICATE OF CORRECTION

Patent No. 3,313,020　　　　　　　　　　　　　　April 11, 1967

William B. Krauskopf

It is hereby certified that error appears in the above numbered patent requiring correction and that the said Letters Patent should read as corrected below.

Column 2, lines 42 to 44, strike out "the insulated container 111 is somewhat simpler in con- its construction. In contrast to the insulated container 11, struction" and insert instead -- its construction. In contrast to the insulated container 11, the insulated container 111 is somewhat simpler in construction --; column 4, line 62, for "assume" read -- assure --; column 5, line 9, for "thse" read -- the --; line 18, for "itselft" read -- itself --; column 10, line 57, for "pescribed" read -- prescribed --.

Signed and sealed this 2nd day of January 1968.

(SEAL)
ATTEST:
EDWARD M. FLETCHER, JR.　　　　　　　　EDWARD J. BRENNER
Attesting Officer　　　　　　　　　　　　Commissioner of Patents